(12) United States Patent
Muramatsu et al.

(10) Patent No.: US 8,881,503 B2
(45) Date of Patent: Nov. 11, 2014

(54) METHOD AND DEVICE FOR PREVENTING FUEL FREEZING IN A POSTPROCESSING BURNER SYSTEM

(75) Inventors: Toshikatsu Muramatsu, Hino (JP); Hisaki Torisaka, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 147 days.

(21) Appl. No.: 13/634,894

(22) PCT Filed: Mar. 9, 2011

(86) PCT No.: PCT/JP2011/001378
§ 371 (c)(1),
(2), (4) Date: Sep. 14, 2012

(87) PCT Pub. No.: WO2011/125287
PCT Pub. Date: Oct. 13, 2011

(65) Prior Publication Data
US 2013/0000279 A1    Jan. 3, 2013

(30) Foreign Application Priority Data

Apr. 7, 2010  (JP) ................................. 2010-088263

(51) Int. Cl.
*F01N 3/00* (2006.01)
*F01N 3/025* (2006.01)
*F02M 25/07* (2006.01)

(52) U.S. Cl.
CPC ............. *F01N 3/025* (2013.01); *F01N 2610/10* (2013.01); *F01N 2610/1486* (2013.01); *F01N 2240/14* (2013.01); *F01N 2610/03* (2013.01); *Y02T 10/121* (2013.01); *F02M 25/0718* (2013.01)
USPC .................................. 60/274; 60/285; 60/295

(58) Field of Classification Search
CPC . F01N 3/025; F01N 2240/14; F01N 2610/03; F01N 2610/1486; F01N 2610/10; F02M 25/0718; Y02T 10/121
USPC ................. 60/272–324; 261/141–145; 165/52
See application file for complete search history.

(56) References Cited

U.S. PATENT DOCUMENTS

| 4,688,537 A * | 8/1987 | Calkins et al. ................. 123/557 |
| 7,581,389 B2 * | 9/2009 | Crawley et al. ................. 60/297 |

(Continued)

FOREIGN PATENT DOCUMENTS

| JP | 5 86845 | 4/1993 |
| JP | 6 167212 | 6/1994 |
| JP | 9 13946 | 1/1997 |
| JP | 2004 52593 | 2/2004 |
| JP | 2009 539026 | 11/2009 |

OTHER PUBLICATIONS

TruckTroubles.com, Cold Weather Operation Considerations, Feb. 20, 2010, http://www.gonefcon.com/trucktcom/coldweather.htm, p. 3.*

(Continued)

*Primary Examiner* — Jesse Bogue
(74) *Attorney, Agent, or Firm* — Oblon, Spivak, McClelland, Maier & Neustadt, L.L.P.

(57) ABSTRACT

Disclosed is a method for preventing fuel freezing in a postprocessing burner system with a burner 14 upstream of a particulate filter 12 (exhaust purification member) incorporated in an exhaust pipe. Fuel is fed from a fuel tank 16 served also for a diesel engine 1 (engine) to the burner 14 through a feed pipe 17, and excess fuel is returned to the fuel tank 16 through a return pipe 18. The fuel is periodically circulated between the burner 14 and the fuel tank 16 through the feed and return pipes 17 and 18 under a condition of ambient air temperature during vehicle travel being at or below a predetermined temperature.

4 Claims, 2 Drawing Sheets

(56) References Cited

U.S. PATENT DOCUMENTS

| | | | |
|---|---|---|---|
| 2003/0033799 A1* | 2/2003 | Scheying | 60/286 |
| 2008/0022654 A1 | 1/2008 | Broderick et al. | |
| 2009/0255232 A1* | 10/2009 | Barcin | 60/274 |
| 2013/0160431 A1* | 6/2013 | Tsumagari | 60/274 |

OTHER PUBLICATIONS

U.S. Appl. No. 13/636,181, filed Sep. 20, 2012, Muramatsu.
International Search Report Issued Jun. 14, 2011 in PCT/JP11/001378 Filed Mar. 9, 2011.

* cited by examiner

METHOD AND DEVICE FOR PREVENTING FUEL FREEZING IN A POSTPROCESSING BURNER SYSTEM

TECHNICAL FIELD

The present invention relates to a method and a device for preventing fuel freezing in a postprocessing burner system.

BACKGROUND ART

In a conventional diesel engine, a particulate filter is incorporated in an exhaust pipe for flow of an exhaust gas to capture particulates (particulate matters) in the exhaust gas. However, the exhaust gas from the diesel engine in a normal operation status rarely has a chance to obtain a temperature level at which the particulates combust by themselves. Consequently, an oxidation catalyst having active species such as Pt and Pd is integrally carried by the particulate filter.

Specifically, employment of such particulate filter carrying the oxidation catalyst facilitates an oxidation reaction of the captured particulates to lower an ignition temperature, so that the particulates can be removed by combustion even at an exhaust gas temperature lower than ever before.

However, even if such particulate filter is employed, an amount of captured particulates will exceed an amount of treated particulates in operation areas with low exhaust temperature levels. Continued operation with such low exhaust temperature levels may hinder sufficient regeneration of the particulate filter, resulting in excessive accumulation of the captured particulates in the particulate filter.

Thus, it has been conceived to additionally arrange a flow-through type oxidation catalyst in front of the particulate filter; with accumulation of the particulates becoming increased, fuel is added to the exhaust gas upstream of the oxidation catalyst to forcibly regenerate the particulate filter.

Specifically, fuel (HC) added upstream of the particulate filter undergoes the oxidation reaction during its passage through the frontward oxidation catalyst. The exhaust gas heated by heat of the reaction and flowing into the particulate filter just behind increases a catalyst bed temperature of the particulate filter to burn off the particulates, thereby regenerating the particulate filter.

However, in a vehicle such as a city shuttle-bus with travel pattern of traveling on congested roads for a long time, the frontward oxidation catalyst hardly has an elevated catalyst bed temperature enough for sufficient catalytic activity and thus an activated oxidation reaction of the added fuel in the oxidation catalyst, failing in effective regeneration of the particulate filter within a short time.

Thus, it has been studied in recent years to arrange a burner on an entry side of the particulate filter and burn off the captured particulates by combustion with the burner regardless of an operating status of the vehicle, thereby efficiently regenerating the particulate filter within a short time.

There exist the following Patent Literatures 1 and 2 as prior art document information relating to this kind of technique on exhaust gas purification catalyst or heating of exhaust gas by use of a burner.

CITATION LIST

Patent Literature

[Patent Literature 1] JP 5-086845A
[Patent Literature 2] JP 6-167212A

SUMMARY OF INVENTION

Technical Problems

It is conceived to perform the forced regeneration of the particulate filter once or twice per day of vehicle travel. However, except when the particulate filter is forcedly regenerated, the burner is stopped and the fuel from and to the burner is stagnant in pipes. As a result, vehicle travel at low ambient air temperature may cause a feed pipe for feed of the fuel from a fuel tank to the burner and a return pipe for return of excess fuel to the fuel tank to be cooled by driving wind or aerodynamic drag into freezing (whole freezing after fluidity seriously lowered due to deposition of highly viscous waxes), failing in combustion with the burner as needed due to clogging of the feed and return pipes.

The invention was made in view of the above and has its object to prevent feed and return pipes for interconnection of a burner and a fuel tank from freezing during vehicle travel under a condition of low ambient air temperature.

Solution to Problems

The invention is directed to a method for preventing fuel freezing in a postprocessing burner system with a burner upstream of an exhaust purification member incorporated in an exhaust pipe, fuel being fed from a fuel tank served also for an engine to a burner through a feed pipe, excess fuel being returned to said fuel tank through a return pipe, characterized in that the fuel is periodically circulated between the burner and the fuel tank through the feed and return pipes under a condition of ambient air temperature during vehicle travel being at or below a predetermined temperature.

During the vehicle travel, an excess of the fuel fed from the fuel tank to the engine is returned to the fuel tank so that the fuel in the fuel tank is in a state of being warmed by the fuel returned from the engine. Thus, the periodical circulation of the fuel between the burner and the fuel tank through the feed and return pipes under a condition of the ambient air temperature during the vehicle travel being at or below the predetermined temperature makes it possible to periodically elevate in temperature the fuel stagnant in the feed and return pipes during stoppage of the burner.

In the method of the invention, it is preferable that a time interval of the periodical circulation of the fuel under the condition of the ambient air temperature being at or below the predetermined temperature is varied depending on the ambient air temperature. Then, as the ambient air temperature lowers, the time interval of the fuel circulation can be shortened to increase a circulation frequency of the fuel.

The invention is also directed to a device for preventing fuel freezing in a postprocessing burner system with a burner upstream of an exhaust purification member incorporated in an exhaust pipe, fuel being fed from a fuel tank served also for an engine to a burner through a feed pipe, excess fuel being returned to said fuel tank through a return pipe, characterized in that it comprises a temperature sensor for detecting ambient air temperature, a pump incorporated in the feed pipe for pumping fuel to the burner, and a controller for receiving a detection signal from said temperature sensor and for driving of said pump on the basis of said detection signal under a condition of ambient air temperature being at or below a predetermined temperature such that the fuel is periodically circulated between the burner and the fuel tank through the feed and return pipes.

In the device of the invention, it is preferable that the controller is adapted to vary a time interval of pump driving for the periodical circulation of the fuel depending on the ambient air temperature under the condition of the ambient air temperature being at or below the predetermined temperature.

Advantageous Effects of Invention

According to a method and device for preventing fuel freezing in a postprocessing burner system as mentioned in the above, various excellent effects can be obtained as mentioned in the below.

(I) Since the fuel in the fuel tank warmed by the excess fuel returned from the engine during the vehicle travel is periodically circulated between the burner and the fuel tank under a condition of ambient air temperature being at or below a predetermined temperature, the fuel stagnant in the feed and return pipes during stoppage of the burner can be elevated in temperature to prevent the fuel in the feed and return pipes from freezing.

(II) If a time interval of the periodical circulation of the fuel under the condition of the ambient air temperature being at or below the predetermined temperature is varied depending on the ambient air temperature, the time interval of the fuel circulation can be shortened as the ambient air temperature lowers, thereby increasing circulation frequency of the fuel. Thus, the fuel can be more reliably prevented from freezing and can be prevented as much as possible from being excessively circulated to suppress electric power consumption to a minimum necessary.

DESCRIPTION OF EMBODIMENT

An embodiment of the invention will be described with reference to the drawings.

Figure 1:
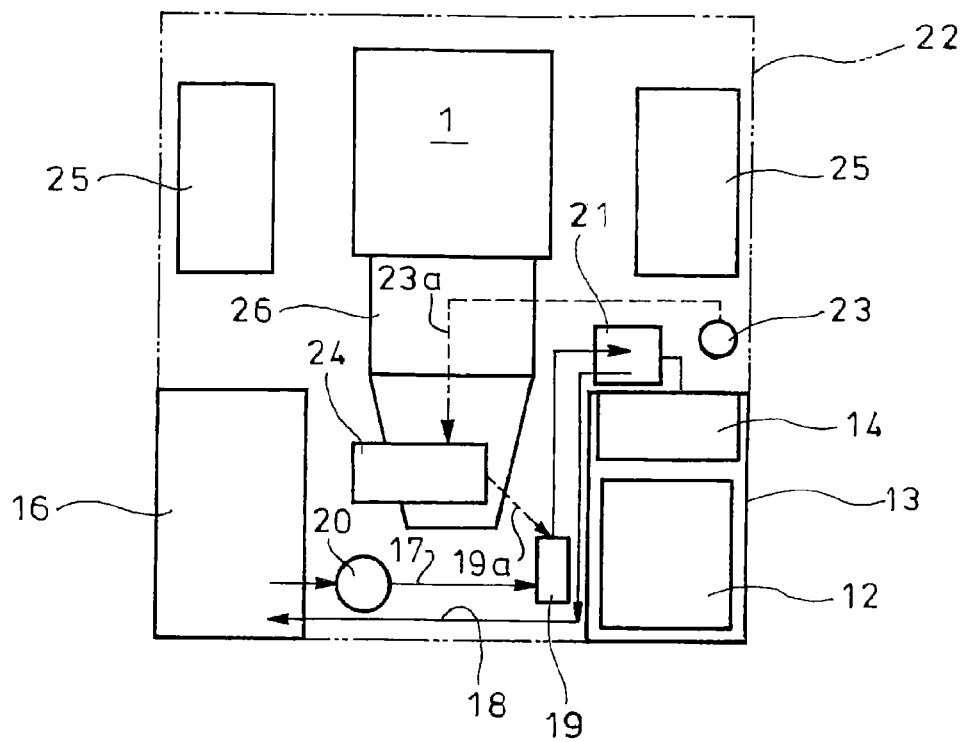
FIG. 1 is a fuel piping system diagram for showing an embodiment of the intention.
Figure 2:
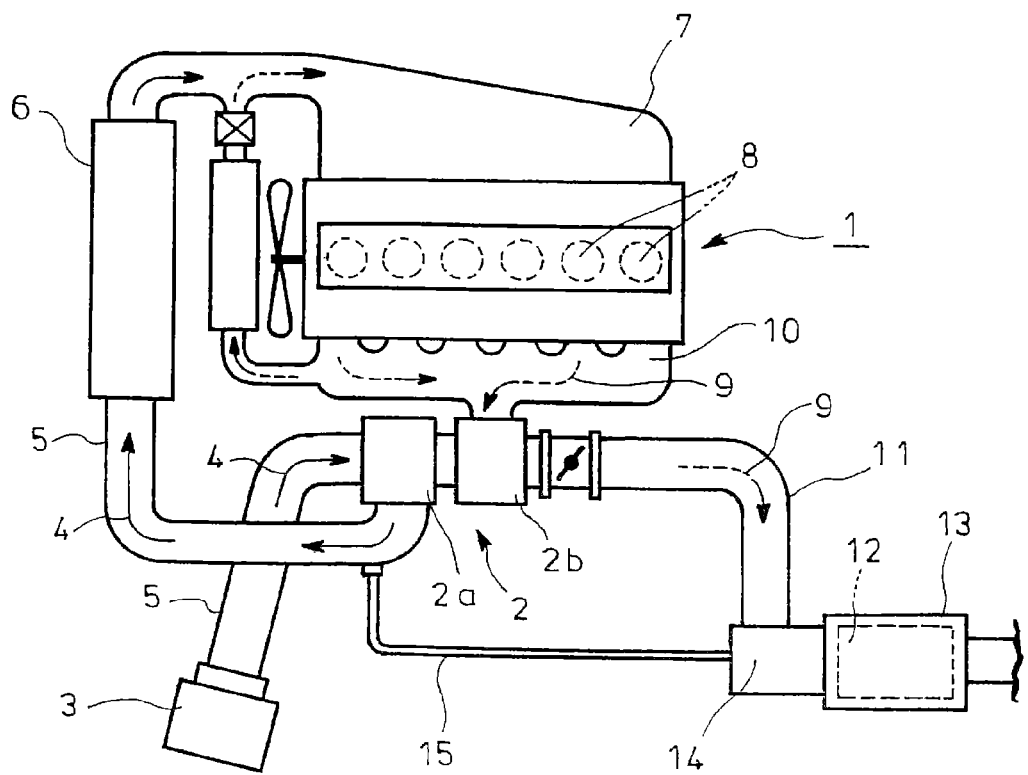
FIG. 2 is a schematic diagram showing a basic construction of a postprocessing burner system to which the invention is applied.

FIGS. 1 and 2 show the embodiment of the invention. FIG. 1 shows a fuel piping system to a burner which is directly related to the embodiment. Firstly, a base construction of a postprocessing burner system will be described with reference to FIG. 2.

In FIG. 2, reference numeral 1 denotes a diesel engine with a turbocharger 2. Intake air 4 from an air cleaner 3 is sent through an intake pipe 5 to a compressor 2a of the turbocharger 2. The intake air 4 pressured by the compressor 2a is sent to an intercooler 6 where the air is cooled and is further guided to an intake manifold 7 where the air is distributed to each of cylinders 8 of the diesel engine (an in-line six-cylinder engine is illustrated in FIG. 1). An exhaust gas 9 discharged from each of the cylinders 8 of the diesel engine 1 is sent through an exhaust manifold 10 to a turbine 2b of the turbocharger 2. The exhaust gas having driven the turbine 2b is sent to an exhaust pipe 11.

Incorporated in the exhaust pipe 11 is a particulate filter 12 (exhaust purification member) which integrally carries an oxidation catalyst and which is encased by a muffler 13. Arranged in front of the particulate filter 12 is a burner 14 which injects a proper amount of fuel and ignites and combusts the fuel. Though it is not shown, the burner 14 includes a fuel injection nozzle for injection of the proper amount of fuel and an ignition plug for ignition of the fuel injected through an injection port of the nozzle.

Connected to the burner 14 is a combustion air supply pipe 15 which is branched downstream from the compressor 2a of the turbocharger 2 such that a part of the intake air 4 supercharged by the compressor 2a is extracted and guided as combustion air.

In the postprocessing burner system shown in FIG. 2, feed of the fuel to the burner 14 is performed through the fuel piping system as shown in FIG. 1. The fuel is fed from a fuel tank 16 served also for the diesel engine 1 through a feed pipe 17 to the burner 14 and excess fuel is returned through pipe 18 to the fuel tank 16.

More specifically, incorporated in the feed pipe 17 is a pump 19 which pumps the fuel to the burner 14. By driving the pump 19, the fuel from the fuel tank 16 is filtered by a fuel filter 20 and is guided to an air atomizer 21 just upstream of the burner 14 where the fuel is mixed with pressurized air (air for atomization) from an air tank (not shown) and is injected in an atomized manner through a fuel injection nozzle. The fuel, which is not used for combustion and becomes excess due to control of an amount of injected fuel, is returned from the air atomizer 21 through the return pipe 18 to the fuel tank 16.

A temperature sensor 23 for detection of ambient air temperature is arranged at an appropriate position in a cab 22 (a cab of, for example, a truck is assumed in FIG. 1) and a detection signal 23a from the temperature sensor 23 is input to a controller 24. Performed in the controller 24 is control by outputting a control signal 19a to the pump 19 for periodical circulation of the fuel between the burner 14 and the fuel tank 16 through the feed and return pipes 17 and 18 on the basis of the detection signal 23a from the temperature sensor 23 under a condition of the ambient air temperature being at or below a predetermined temperature.

Figure 3:
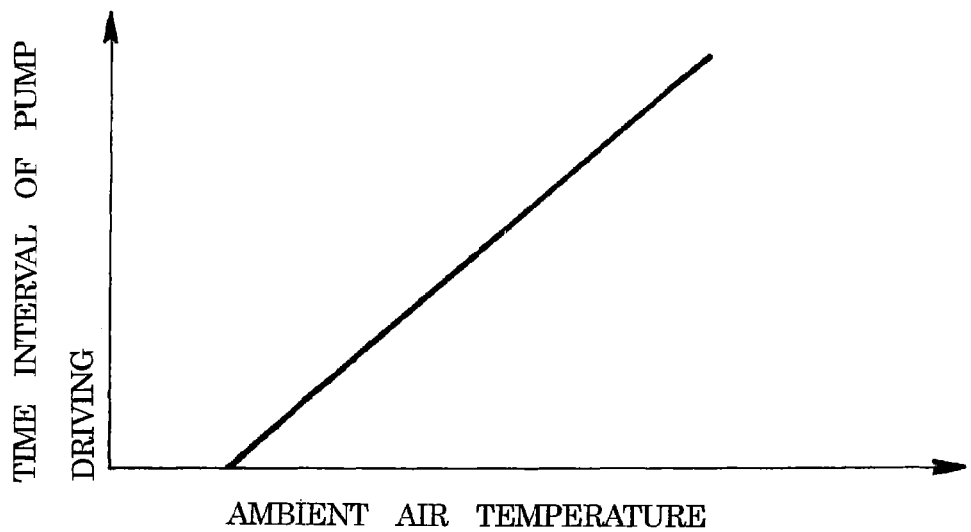
FIG. 3 is a graph showing a relationship between ambient air temperature and pump driving.

A time interval of pump 19 driving for the periodic circulation of the fuel under the condition of the ambient air temperature being at or below the predetermined temperature is varied in the controller 24 as needed depending on the ambient air temperature such that, as plotted in FIG. 3, the time interval of the fuel circulation is shortened as the ambient air temperature lowers.

In FIG. 1, the reference numeral 25 denotes wheels laterally on opposite sides of the vehicle; and 26, a transmission.

Thus, as is conventionally well-known, an excess of the fuel fed from the fuel tank 16 to the diesel engine 1 is returned to the fuel tank 16 during the vehicle travel so that the fuel in the fuel tank 16 is in a state of being warmed by the fuel returned from the diesel engine 1. Thus, during the vehicle travel, the fact that the ambient air temperature is at or below the predetermined temperature is determined by the controller 24 on the basis of the detection signal 23a from the temperature sensor 23 to periodically drive the pump 19 by a control signal 19a from the controller 14; thus, the fuel is circulated between the burner 14 and the fuel tank 16 through the feed and return pipes 17 and 18 to thereby periodically elevate in temperature the fuel stagnant in the feed and return pipes 17 and 18 during stoppage of the burner 14.

Thus, according to the embodiment, since the fuel in the fuel tank 16 warmed by the excess of the fuel returned from the diesel engine 1 is periodically circulated between the burner 14 and the fuel tank 16 under the condition of the ambient air temperature being at or below the predetermined temperature, the fuel stagnant in the feed and return pipes 17 and 18 during the stoppage of the burner 14 can be periodically elevated in temperature, thereby preventing the fuel from freezing in the feed and return pipe 17 and 18.

Figure 4:
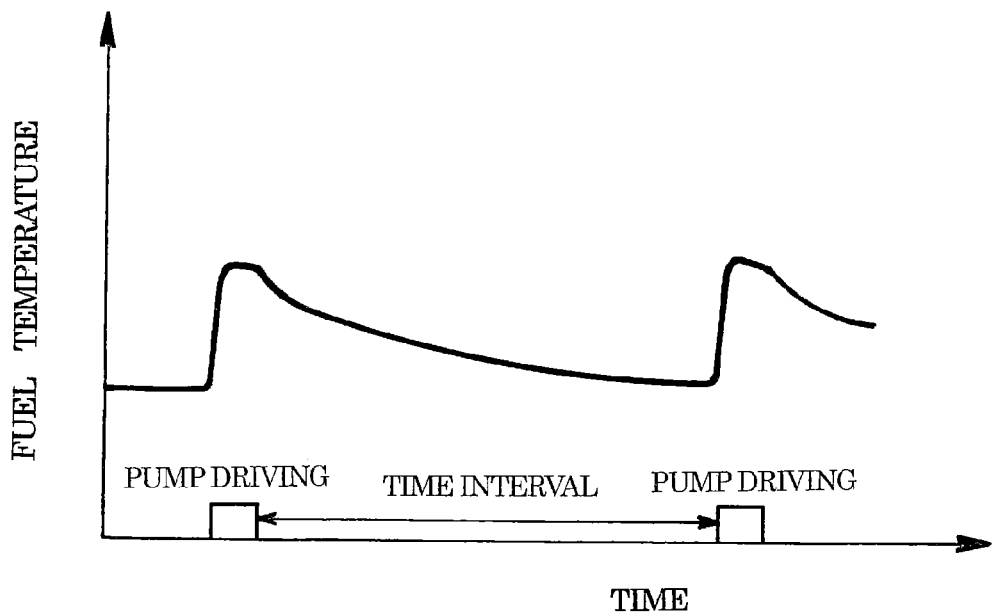
FIG. 4 is a graph showing a relationship between pump driving and fuel temperature.

FIG. 4 is a graph showing a relationship between driving of the pump 19 and the fuel temperature, the temperature detection being made at a position adjacent to a connection of the return pipe 18 to the fuel tank 16. As illustrated here, the fuel temperature rises just after the pump 19 is driven to start circulation of the fuel between the burner 14 and the fuel tank 16, and even after the stoppage of the driving of the pump 19 the fuel temperature can be kept in a temperature range free from fear of freezing during the time interval till the next driving of the pump 19.

As plotted in FIG. 4, the fuel temperature after stoppage of the driving of the pump 19 gradually lowers. A degree of the lowering varies depending on the ambient air temperature; if the time interval of the fuel circulation is shortened as the ambient air temperature lowers, then the fuel in the feed and return pipes 17 and 18 can be more reliably prevented from freezing and the fuel can be prevented as much as possible from being excessively circulated to suppress the electric consumption to suppress electric power consumption to a minimum necessary.

It is to be understood that the method and device for preventing fuel freezing in a postprocessing burner system according to the invention are not limited to the embodiment described above. Though the description on the embodiment has been made with respect to a particulate filter as an exhaust purification member, the postprocessing burner system of the invention may also be applied to various exhaust gas purification catalysts as exhaust purification member such as a selective reduction catalyst having a characteristic of selectively reacting $NO_x$ with a reducing agent even in the presence of oxygen or a $NO_x$-occluded reduction catalyst having a characteristic of oxidizing $NO_x$ in an exhaust gas when an air/fuel ratio of the exhaust gas is lean to temporarily occlude $NO_x$ in the form of nitrate and dissolving and discharging $NO_x$ through the intervention of unburned HC, CO or the like to perform a reductional purification when an $O_2$ concentration in the exhaust gas is decreased. Specifically, the invention may be also similarly applied to a postprocessing burner system using a burner to increase the temperature of such exhaust gas purification catalyst in a cooling state to an activation temperature range.

REFERENCE SIGNS LIST

1 diesel engine (engine)
11 exhaust pipe
12 particulate filter (exhaust purification member)
14 burner
16 fuel tank
17 feed pipe
18 return pipe
19 pump
19*a* control signal
23 temperature sensor
23*a* detection signal
24 controller

The invention claimed is:

1. A method to prevent fuel freezing in a postprocessing burner system with a burner upstream of an exhaust purification member incorporated in an exhaust pipe, where fuel is fed from a fuel tank served also for an engine to a burner through a feed pipe, and excess fuel is returned to said fuel tank through a return pipe, the method comprising:
   periodically circulating the fuel in the fuel tank, which is warmed by the fuel returned from the engine, between the burner and the fuel tank through the feed and return pipes under a condition of ambient air temperature during vehicle travel, where the ambient air temperatures is at or below a predetermined temperature.

2. The method for preventing fuel freezing in the postprocessing burner system as claimed in claim 1, wherein
   a time interval of the periodical circulation of the fuel under the condition of the ambient air temperature being at or below the predetermined temperature is varied depending on the ambient air temperature.

3. A device to prevent fuel freezing in a postprocessing burner system with a burner upstream of an exhaust purification member incorporated in an exhaust pipe, where fuel is fed from a fuel tank served also for an engine to a burner through a feed pipe, and excess fuel is returned to said fuel tank through a return pipe, comprising:
   a temperature sensor to detect ambient air temperature,
   a pump incorporated in the feed pipe to pump fuel to the burner, and
   a controller to receive a detection signal from said temperature sensor and to drive said pump based on said detection signal under a condition of ambient air temperature being at or below a predetermined temperature such that the fuel in the fuel tank, which is warmed by the fuel returned from the engine, is periodically circulated between the burner and the fuel tank through the feed and return pipes.

4. The device for preventing fuel freezing in the postprocessing burner system as claimed in claim 3, wherein
   the controller is to vary a time interval of pump driving for the periodical circulation of the fuel depending on the ambient air temperature under the condition of the ambient air temperature being at or below the predetermined temperature.

* * * * *